United States Patent [19]

Kaneko

[11] Patent Number: 4,939,951
[45] Date of Patent: Jul. 10, 1990

[54] IMPACT ABSORBING STRUCTURE FOR USE IN STEERING WHEELS AND THE LIKE

[75] Inventor: Kazuhiro Kaneko, Shizuoka, Japan
[73] Assignee: Nihon Plast Co., Ltd., Fuji, Japan
[21] Appl. No.: 218,318
[22] Filed: Jul. 12, 1988
[30] Foreign Application Priority Data Jul. 14, 1987 [JP] Japan .................. 62-107795

[51] Int. Cl.$^5$ ............................................. B62D 1/04
[52] U.S. Cl. .................................... 74/552; 280/750
[58] Field of Search ............... 74/552, 558; 280/750, 280/777, 778, 731; 29/159 B

[56] References Cited

U.S. PATENT DOCUMENTS

| 3,167,974 | 2/1965 | Wilfert et al. | 74/552 |
| 3,589,210 | 6/1971 | Norman | 74/552 |
| 3,659,476 | 5/1972 | Wilfert et al. | 280/750 X |
| 3,822,608 | 7/1974 | Murase et al. | 74/493 |
| 3,945,662 | 3/1976 | Murase et al. | 74/492 |
| 4,123,948 | 11/1978 | Zeller | 74/492 |
| 4,200,309 | 4/1980 | Korn et al. | 280/750 |
| 4,606,240 | 8/1986 | Sakane | 74/552 |
| 4,657,121 | 4/1987 | Uchida et al. | 280/750 X |
| 4,660,852 | 4/1987 | Katayama et al. | 280/750 |
| 4,790,209 | 12/1988 | Ishida | 280/750 X |

FOREIGN PATENT DOCUMENTS

| 531531 | 12/1973 | Japan . | |
| 5842251 | 6/1980 | Japan . | |
| 58-152660 | 3/1982 | Japan . | |
| 0261752 | 12/1985 | Japan | 280/750 |
| 0060348 | 3/1986 | Japan | 280/750 |
| 0081253 | 4/1986 | Japan | 74/552 |
| 0050272 | 3/1987 | Japan | 74/552 |
| 0210163 | 9/1987 | Japan | 280/750 |
| 0263014 | 11/1987 | Japan | 280/750 |

Primary Examiner—Vinh T. Luong
Attorney, Agent, or Firm—Bachman & LaPointe

[57] ABSTRACT

An impact absorbing structure for use in steering wheels and the like is formed by slitting a blank and pressing the same in a manner to define a plurality of L-shaped members which are alternatively and mutually inverted with respect to one another. The vertically extending leg portions of the L-shaped members are bent in a manner which facilitates buckling during collisions and the like.

8 Claims, 3 Drawing Sheets

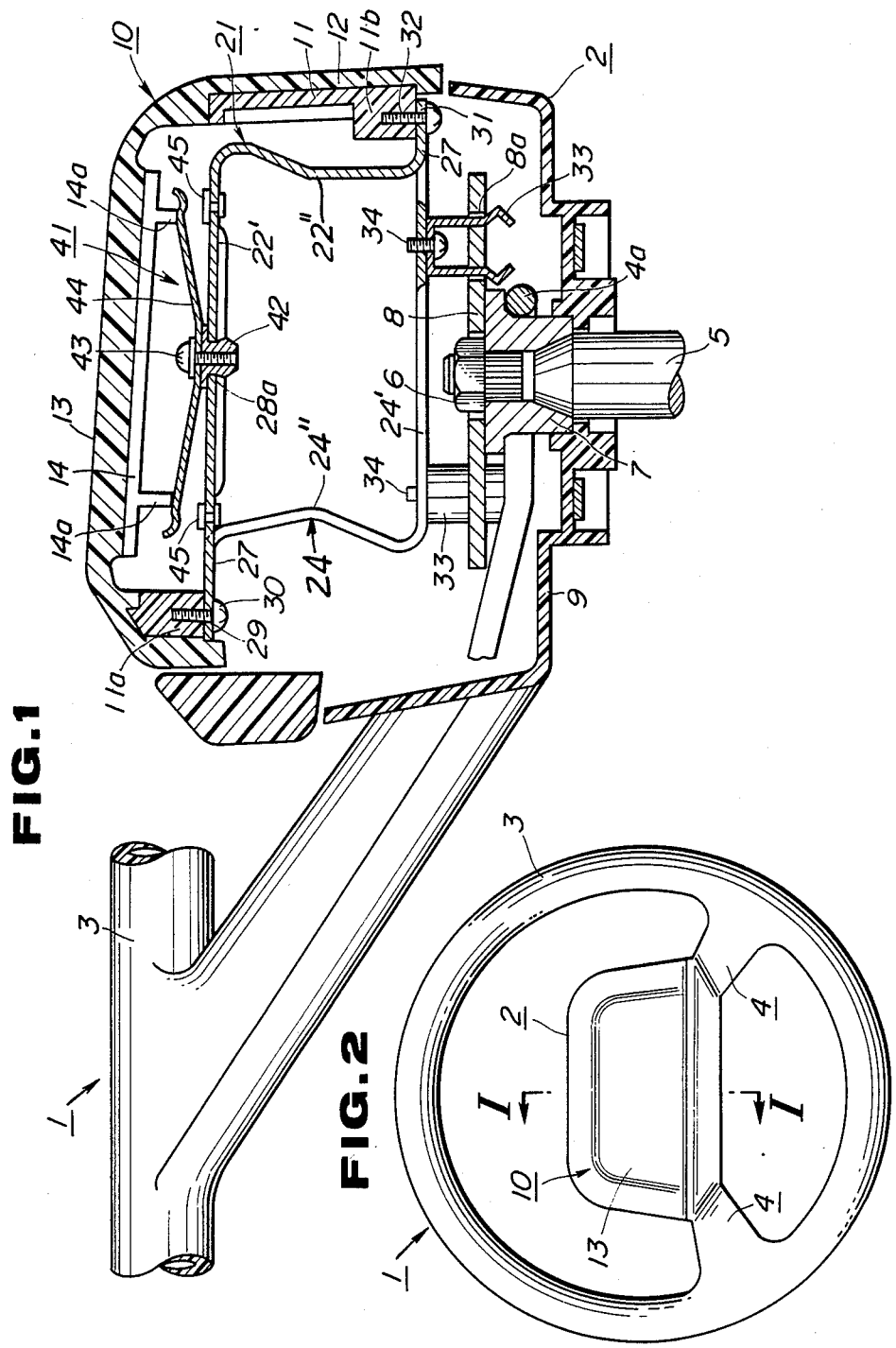

IMPACT ABSORBING STRUCTURE FOR USE IN
STEERING WHEELS AND THE LIKE

BACKGROUND OF THE INVENTION

1. Field of the Invention

The present invention relates generally to steering wheels and more specifically to a impact absorbing structure for use therein.

2. Description of the Prior Art

JP-A-58-152660 discloses a impact absorbing arrangement which is designed to support a pad which is provided on the hub of an automotive steering wheel. This arrangement has been formed in a manner to have an essentially inverted U-shaped cross- section and for the side sections thereof to extend inwardly from an impact receiving portion. The impact absorbing portion is connected with the pad by way of screws and the assembly disposed on the boss section of the steering wheel in a manner wherein the respective impact receiving sections are arranged to engage the elements of the wheel such as the boss plate thereof.

However, this arrangement has suffered from the drawback in that due to the U-shaped cross-sectional shape the end sections which extend inwardly relative to the impact receiving portions include projections which define undercut arrangements and which render the press working and production difficult and expensive.

Further, as the arrangements are formed of sheet metal they are prone to be bent and distorted while being transported or when stacked in storage areas.

SUMMARY OF THE INVENTION

It is an object of the present invention to provide a impact absorbing arrangement with which a saftey pad or the like can be supported on a steering wheel or similar arrangement, which is simple in design and easy and economical to produce and which reduces piece to piece variation during production.

It is a further object of the present invention to provide an impact absorbing arrangement which can be stacked and transported with ease and which does not undergo distortion and the like during storage and/or transportation.

In brief, the above objects are achieved by an arrangement wherein the blank is slit and subsequently pressed in a manner to define a plurality of L-shaped members which are alternatively mutually inverted with respect to one and other. The vertically extending leg portions are bent in a manner which facilitates buckling during collisions and the like.

More specifically, a first aspect of the present invention comprises an energy absorbing support structure which features: a first laterally extending end member; a first essentially L-shaped member, said first essentially L-shaped member having first and second leg portions, said first leg portion being straight and integral with said first laterally extending end member, said second leg portion being bent to facilitate buckling thereof upon the application of a predetermined force; a second laterally extending end member; a second essentially L-shaped member, said second essentially L-shaped member having first and second leg portions, said first leg portion being straight and integral with said second laterally extending end member, said second leg portion being bent to facilitate buckling thereof upon the application of a predetermined force, said second essentially L-shaped member being arranged to be mutually inverted with respect to the first essentially L-shaped member; said second leg portion of said first essentially L-shaped member merging with said second laterally extending end member; and said second leg portion of said second essentially L-shaped member merging with said first laterally extending end member.

A second aspect of the present invention comprises a vehicle, the vehicle featuring: a steering column including a steering shaft; a steering wheel fixedly connected to the upper end of said steering shaft, said steering wheel incuding a rim, at least one spoke and a hub section; a cover for covering said hub section; a structure for supporting said cover on said hub, said structure comprising: a first laterally extending end member; a first essentially L-shaped member, said first essentially L-shaped member having first and second leg portions, said first leg portion being straight and integral with said first laterally extending end member, said second leg portion being bent to facilitate buckling thereof upon the application of a predetermined force; a second laterally extending end member; a second essentially L-shaped member, said second essentially L-shaped member having first and second leg portions, said first leg portion being straight and integral with said second laterally extending end member, said second leg portion being bent to facilitate buckling thereof upon the application of a predetermined force, said second essentially L-shaped member being arranged to be mutually inverted with respect to the first essentially L-shaped member; said second leg portion of said first essentially L-shaped member merging with said second laterally extending end member; said second leg portion of said second essentially L-shaped member merging with said first laterally extending end member; means defining connection holes in said first and second laterally extending end members, said connection holes receiving screws which are threaddedly received in a first insert included in said cover; a camp spring, said clamp spring being detachably connected to one of said first and second L-shaped leg members and arranged to be detachably inserted into a connection aperture formed in a plate which defines part of said hub.

A third aspect of the invention comprises a method of forming a impact absorbing structure, the method featuring the steps of: forming a plurality of slits in a blank; pressing said blank in a manner to bend the sections of the blank defined between the slits into first and second L-shape members and first and second laterally extending end members; and bending selected arms of said first and second L-shaped members in manner wherein buckling thereof is facilitated upon the application of a predetermined force.

BRIEF DESCRIPTION OF THE DRAWINGS

The construction, arrangement, attendant merits and advantages of the present invention will become more clearly understood as a description of the preferred embodiments is made in conjunction with the appended drawings in which:

FIG. 1 is a sectional elevation of a steering wheel hub as taken along section line I—I of FIG. 2 which shows a first embodiment of the present invention installed therein;

FIG. 2 is a front elevation of a steering wheel of the nature shown in FIG. 1 and which shows the nature of the pad which is supported by the first embodiment of the present invention;

DETAILED DESCRIPTION OF THE PREFERRED EMBODIMENTS

Figure 3:
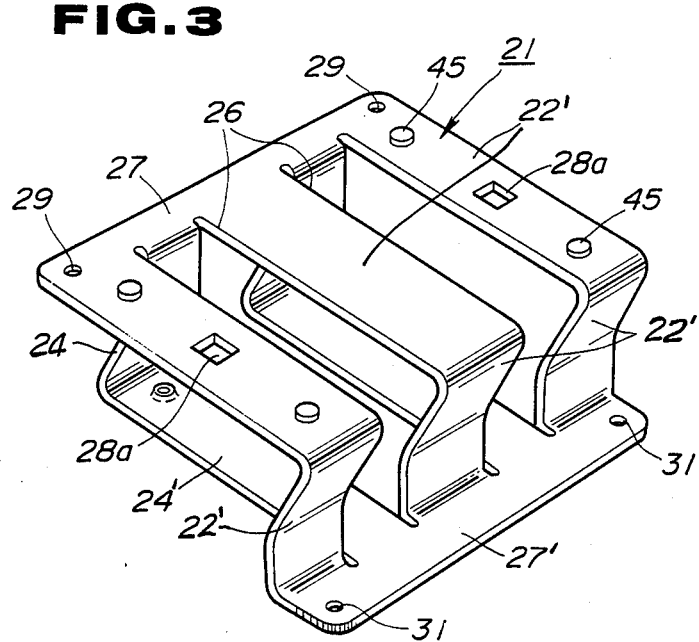
FIG. 3 is a perspective view of a first embodiment of the present invention.

FIGS. 1 and 2 show a steering wheel 1 which includes a boss section 2. As will be appreciated this boss section 2 is connected with a rim 3 by way of spokes 4. The boss section 2 is fixedly connected to the upper end of a steering shaft 5 by way of a nut 6 and a metallic boss 7. The metallic boss 7 is fixedly connected to the inboard ends of the metallic cores 4a of the spokes 4 in a manner which supports the same in the illustrated positions. A metallic boss plate 8 is welded to the upper face of the boss 7. This metallic boss plate 8 is provided with connection apertures 8a. The purpose of these apertures will become more clearly appreciated hereinafter.

The lower portion of the boss section 2 includes a cover 9 which extends upwardly toward the lower edge of an elastomeric pad member 10. The cover 9 includes an aperture (no numeral) the inner periphery of which engages the lower external peripheral surface of the metallic boss 7.

The pad 10 includes an insert 11 which is made of either metal or a hard plastic and a softer cover 12 which is made of a suitable skinned elastomer or the like. In this arrangement the cover is moulded onto the insert in a manner to be essentially integral therewith. The pad 10 further includes a second insert 14 which is fixedly connected to the lower face of a horn pad section 13 formed in the cover member 12 and provided with projections 14a which extend downwardly in the direction of the steering column 5, boss plate 8 and the like. In the attached position the insert 14 is resiliently supported in a manner which permits the same to be moved inwardly in response to pressure which is applied to the external surface of the horn pad 13 and in accordance with the flexibility of the material from which the cover 12 is formed.

The illustrated arrangement includes an impact absorbing structure 21 according to a first embodiment of the present invention. As best seen in FIG. 3 this structure is formed in a manner to have (in this embodiment) three essentially parallel impact receiving sections 22' which are integral with an upper connection section 27 and which are arranged to be operatively connected with the inner surface of the pad 10 in a manner to receive large forces which are applied thereto such as tend to occur during vehicle collisions and the like; three essentially vertical shaped sections or leg portions 22'' which interconnect the impact receiving sections 22' with and are integral with a lower connection section 27' which are arranged to buckle under the application of a predetermined force and thus aborb the applied forces; and two lower essentially parallel sections 24' which are adapted to be connected to the boss plate 8. Two essentially leg portions 24'' interconnect the lower parallel sections or leg portions 24' with an upper connection member 27.

This impact absorbing structure is formed from a single plate of suitable sheet metal which is drilled, stamped or similarly machined or worked in a manner to form connection holes 29, 31, connection apertures 28a, and a plurality of slits 26 which define a plurality of essentially parallel finger-like arrangements therebetween. The finger-like members merge with integral connection sections 27' which extend latterally across the ends of the fingers and interconnect the same.

The plate which is thus prepared is then subject to press working in a manner wherein alternative fingers are pressed in alternative directions and bent into L-shape configurations. The vertical extending portions 22'' and 24'' are further bent inwardly proximate their mid-sections so as to ensure that they will buckle in the desired manner upon a large force being applied thereto.

Following this shaping operation, the impact absorbing structure 21 is connected to the pad 10. In this embodiment the connection holes 29 formed at the upper corners of the upper connection section 27 which extends across the upper end of the structure 21 and which interconnects the impact receiving sections 22', are used to connect the upper end of the structure 21 to a connection boss 11a of the insert 11 via the insertion of screws 30 (only one shown in FIG. 1). In addition to this the connection holes formed in the connection member 27' which extends across the lower end of the structure and which interconnects the lower sections 24', are used to establish a connection between a second lower connection boss 11b via the insertion of screws 32.

Clamp springs 33 are secured to lower faces of the lower sections 24' by way of screws 34.

A horn switch arrangement generally denoted by the numeral 41 is mounted on top of the impact absorbing structure 21 in the manner shown in FIG. 1. Viz., rubber grommets 42 are disposed through the rectangular connection apertures 28a formed in the upper impact receiving sections 22. Elongate electrically conductive angled springy plate members 44 are connected at essentially their mid points to the grommets 42 by way of screws 43. The ends of the plate members 44 are arranged to contact the projections 14a which depend from the insert 14 attached the lower face of the horn pad 13. Stud-like members 45 which take the form of rivets or the like, are set in the outboard two of the three impact receiving sections 22, and act as grounding contacts which are engaged by the plate members 44 upon the horn pad 13 being depressed. In the instant arrangement the steering shaft 5 and associated elements are connected with the negative pole of the car battery while the plates 44 are connected with the positive pole.

With the arrangement thus far assembled the pad and the impact absorbing structure are disposed on the boss plate by pressing the clamp springs 33 through the connection apertures 8a formed in the boss plate 8. The clamp springs 33 are made of an electrically conductive material and thus establish an electrical connection between the steering shaft 5, boss plate 8 etc., and the contacts 45.

With the arrangement thus completely assembled, in the event of a vehicular collision or the like wherein the occupant is caused to impact on the steering wheel, the vertical bent portions 23 of the impact absorbing structure 21 buckle and absorb the impact force in a manner which reduces the risk of injury the occupant.

As the impact absorbing structure 21 is formed of a single flat blank which can be drilled or otherwise press worked in a manner to provide the required apertures, holes and slits which define an essential feature of the present invention, can be precisely formed in the flat blank with ease and the minimum of operations. This pressing of the blank in a manner to assume the shape shown in FIG. 3 is simple and readily carried out. As will be appreciated with this pressing technique it is inherent that no undercut sections are formed.

In addition the pad and the impact absorbing structure can be assembled as a separate unit with the minimum of trouble. The precision with which the connection holes and the like are formed further ensure that misalignment of holes such as encountered with the prior art is obviated.

The clamp springs 33 of course allow very easy assembly and or replacement of a unit following a collision.

Figure 4:
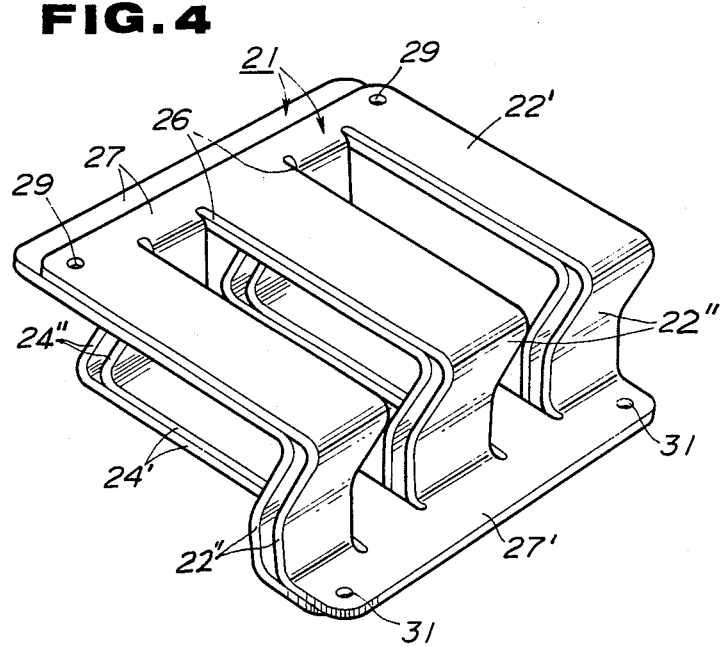
FIG. 4 is a perspective view showing the manner in which impact absorbing structures according to the present invention can be stacked for transportion and storage purposes.

Additionally the shape of the impact absorbing structure 21 is such as to permit a plurality of the same to be stacked in the manner shown in FIG. 4. This of course permits a large number to be stacked in a relatively small space and further provides for easy transportation between production, storage and/or production sites.

Figure 5:
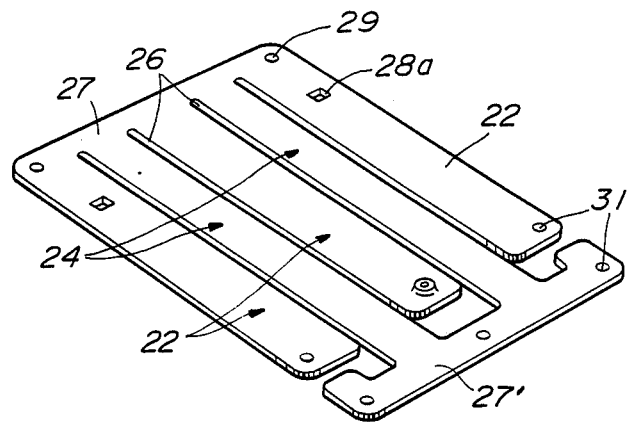
FIG. 5 is a perspective view showing a second embodiment of the present invention in a partially completed state.
Figure 6:
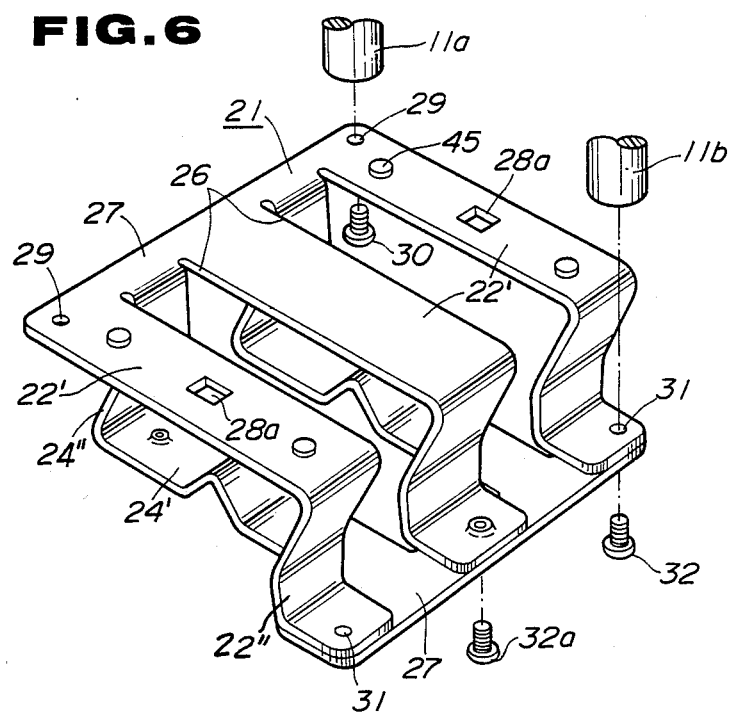
FIG. 6 is a perspective view showing the second embodiment in a fully completed condition.

FIGS. 5 and 6 show a second embodiment of the present invention. FIG. 5 shows a blank which is pressed formed in a manner to define the finger-like arrangment which can be bent via subsequent press working into the configuration shown in FIG. 6.

In order to induce the connection holes 31 to align in the manner shown in FIG. 6, the length of the two longer "fingers" is shortened by the formation of an invert V-shape bend in the mid section thereof.

The assembly and operation of the second embodiment is essentially the same as the first and provides all of the advantages thereof.

What is claimed is

1. An energy absorbing support structure comprising:
   a first laterally extending end member;
   a first essentially L-shaped member, said first essentially L-shaped member having first and second leg portions, said first leg portion being straight and one-piece formed with said first laterally extending end member, said second leg portion being sent to facilitate buckling thereof upon the application of a predetermined force;
   a second laterally extending end member;
   a second essentially L-shaped member, said second essentially L-shaped member having first and second leg portions, said first leg portion of said second essentially L-shaped member being straight and one-piece formed with said second laterally extending end member, said second leg portion of said second essentially L-shaped member being bent to facilitate buckling thereof upon the application of a predetermined force, said second essentially L-shaped member being arranged mutually inverted with respect to the first essentially L-shaped member;
   said first essentially L-shaped member being connected at a first end to said first laterally extending member and arranged so that a second end thereof is connected to said second laterally extending member, said second essentially L-shaped member being connected at a first end to said second laterally extending member and connected at a second end to said first laterally extending member, said first essentially L-shaped member and said second essentially L-shaped member being arranged so that said second leg portion of said first essentially L-shaped member is directly connected to said second laterally extending end member; and
   said second leg portion of said second essentially L-shaped member is directly connected to said first laterally extending end member.

2. A support structure as claimed in claim 1 further comprising a clamp spring, said clamp spring being detachably secured to one of said first and second essentially L-shaped members and arranged to permit the structure to be releasably connected with a second structure in which connection openings into which said clamp spring can be inserted are formed.

3. A support structure as claimed in claim 1 further comprising:
   means defining connection holes in at least one of said laterally extending end members, said connection holes serving to receive fastening members and for facilitating the connection of the structure with other members.

4. A support structure as claimed in claim 1 wherein said second leg portion of said first essentially L-shaped member is bent at essentially its mid portion so that when it buckles under the application of said predetermined force, it tends to fold in half, and wherein said second leg portion of said second essentially L-shaped member is bent at essentially its mid portion so that when it buckles under the application of said predetermined force, it tends to fold in half.

5. A support structure as claimed in claim 1 wherein said structure is formed of an electrically conductive material and used to form part of an electrical circuit.

6. An energy absorbing support structure comprising:
   a first laterally extending end member;
   a first essentially L-shaped member, said first essentially L-shaped member having first and second leg portions, said first leg portion being straight and one-piece formed with said first laterally extending end member, said second leg portion being bent to facilitate buckling thereof upon the application of a predetermined force;
   a second laterally extending end member;
   a second essentially L-shaped member, said second essentially L-shaped member having first and second leg portions, said first leg portion of said second essentially L-shaped member being straight and one-piece formed with said second laterally extending end member, said second leg portion of said second essentially L-shaped member being bent to facilitate buckling thereof upon the application of a predetermined force, said second essentially L-shaped member being arranged mutually inverted with respect to the first essentially L-shaped member;
   said first essentially L-shaped member being connected at a first end to said first laterally extending member and arranged so that a second end thereof is connected to said second laterally extending member, said second essentially L-shaped member being connected at a first end to said second laterally extending member and connected at a second end to said first laterally extending member, said first essentially L-shaped member and said second essentially L-shaped member being arranged so that said second leg portion of said first essentially L-shaped member is directly connected to said second laterally extending end member;

said second leg portion of said second essentially L-shaped member is directly connected to said first laterally extending end member;

a third essentially L-shaped member, said third essentially L-shaped member having first and second leg portions, said first leg portion of said third essentially L-shaped member being straight and integral with said first laterally extending end member, said second leg portion of said third essentially L-shaped member being bent to facilitate buckling thereof upon the application of a predetermined force; and a fourth essentially L-shaped member, said fourth essentially L-shaped member having first and second leg portions, said first leg portion of said fourth essentially L-shaped member being straight and one-piece formed with said second laterally extending end member, said second leg portion of said fourth essentially L-shaped member being bent to facilitate buckling thereof upon the application of a predetermined force, said fourth essentially L-shaped member being arranged mutually inverted with respect to the third essentially L-shaped member.

7. In a vehicle, a steering column including a steering shaft;

a steering wheel fixedly connected to the upper end of said steering shaft, said steering wheel including a rim, at least one spoke and a hub section;

a cover for covering said hub section;

a structure for supporting said cover on said hub, said structure comprising:

a first laterally extending end member;

a first essentially L-shaped member, said first essentially L-shaped member having first and second leg portions, said first leg portion being straight and one piece formed with said first laterally extending end member, said second leg portion being bent to facilitate buckling thereof upon the application of a predetermined force;

a second laterally extending end member;

a second essentially L-shaped member, said second essentially L-shaped member having first and second leg portions, said first leg portion of said second essentially L-shaped member being straight and one-piece formed with said second laterally extending end member, said second leg portion of said second essentially L-shaped member being bent to facilitate buckling thereof upon the application of a predetermined force, said second essentially L-shaped member being arranged mutually inverted with respect to the first essentially L-shaped member;

said second leg portion of said first essentially L-shaped member being directly connected to said second laterally extending end member;

said second leg portion of said second essentially L-shaped member being directly connected to said first laterally extending end member;

means defining connection holes in said first and second laterally extending end members, said connection holes receiving screws which are threadly received in a first insert included in said cover; and a clamp spring detachably connected to one of said first and second essentially L-shaped members and arranged to be detachably inserted into a connection aperture formed in a plate which defines part of said hub.

8. A vehicle as claimed in claim 7 further comprising a horn switch, said horn switch comprising a flexible arm insulatingly mounted on the other of said first and second essentially L-shaped members, said flexible arm connecting a second insert fixed to a predetermined portion of an inner surface of said cover, said predetermined portion being arranged to be sufficiently flexible as to enable said second insert to be moved against said flexible arm in a manner to bring said flexible arm into contact with a portion of said supporting structure, said flexible arm and said supporting structure being arranged to define part of an electrical circuit when in contact with one and other.

* * * * *

UNITED STATES PATENT AND TRADEMARK OFFICE
CERTIFICATE OF CORRECTION

PATENT NO. : 4,939,951

DATED : July 10, 1990

INVENTOR(S) : Kazuhiro Kaneko

It is certified that error appears in the above-identified patent and that said Letters Patent is hereby corrected as shown below:

In column 4, line 10, after "sections" insert --27,--.

In column 5, claim 1, line 47, delete "sent" and insert --bent--.

Signed and Sealed this

Fifth Day of May, 1992

Attest:

DOUGLAS B. COMER

*Attesting Officer*   *Acting Commissioner of Patents and Trademarks*